O. J. KENNEDY.
SPRINKLING PIPE.
APPLICATION FILED JUNE 26, 1909.
978,597.
Patented Dec. 13, 1910.
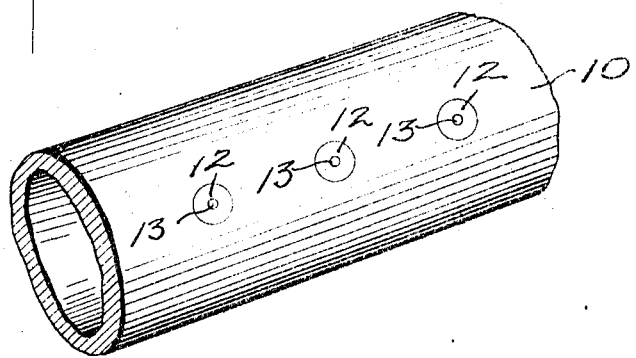
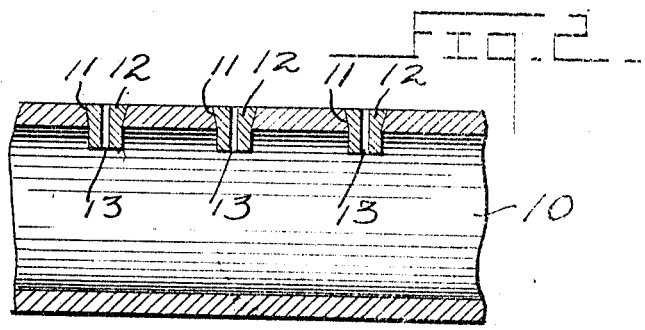
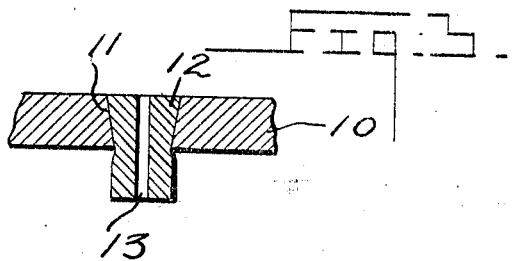
Witnesses
C. E. Johansen.
M. L. Low.
Inventor
Oliver Jefferson Kennedy
By Woodward & Chandlee
Attorney

UNITED STATES PATENT OFFICE.

OLIVER JEFFERSON KENNEDY, OF SAN DIEGO, CALIFORNIA, ASSIGNOR OF ONE-HALF TO PATRICK W. SWEENEY, OF LOS ANGELES, CALIFORNIA.

SPRINKLING-PIPE.

978,597.  Specification of Letters Patent.  Patented Dec. 13, 1910.

Application filed June 26, 1909. Serial No. 504,536.

*To all whom it may concern:*

Be it known that I, OLIVER JEFFERSON KENNEDY, a citizen of the United States, residing at San Diego, in the county of San Diego and State of California, have invented certain new and useful Improvements in Sprinkling-Pipes, of which the following is a specification.

This invention relates to new and useful improvements in water pipes.

The object of my invention is to provide a sprinkling pipe, having a plurality of discharge openings, each containing a sprinkling nipple so arranged as to be practically proof against clogging by corrosion.

Another object is to provide a sprinkling pipe with a plurality of non-corroding nipples which are driven into and partly through a tapering opening to protrude into the pipe a comparatively short distance.

A still further object is to provide a sprinkling pipe with a nipple of compressible metal which is driven under force into and partly through a slightly tapering seat so that the protruding ends of the nipples will expand after protrusion to securely hold the nipple to its seat.

With these and other objects in view, the present invention consists in the combination and arrangement of parts as will be hereinafter more fully described and particularly pointed out in the appended claim, it being understood that changes in the specific structure shown and described may be made within the scope of the claim without departing from the spirit of the invention.

In the drawings forming a part of this specification, and in which like numerals of reference indicate similar parts in the several views, Figure 1 is a perspective view of a pipe constructed according to my invention. Fig. 2 is a longitudinal sectional view through the pipe and nipples. Fig. 3 is a transverse sectional view of one of the nipples.

As water pipe is usually made of iron, and as the pipe is subject to corrosion and will further become incrusted, it is quite essential to provide a sprinkling pipe when made of iron with a nipple, so constructed as to prevent clogging and corrosion of the same.

My present invention provides a sprinkling pipe so constructed that the sprinkling nipples will be practically proof against corrosion.

As clearly shown in the drawings the pipe 10 represents an ordinary water pipe of any suitable length and diameter, provided along its length with a plurality of slightly tapering openings 11, leading from the outer periphery of said pipe with their smallest diameters on a line with the inner surface of the pipe. Held within each conical seat 11 is a plug 12, made of some non-corroding compressible metal, and these plugs are driven under force into the tapered seats so that their inner ends will protrude into the pipe a suitable distance, as shown in the drawings. As the plug is carried through the seat in a compressed condition, as soon as the inner end protrudes beyond the seat opening the metal expands to a certain degree, so that the plug is firmly held to its seat. The outer end of the plug is flush with the outer surface of the pipe and conforms to the surface of the same. After the plugs have been properly positioned they are provided with the centrally located bore 13, as shown. As the inner end of the nipple-forming plug projects into the pipe a considerable distance, the corrosion or scale forming upon the inner surface of the pipe can in no way interfere with the free discharge of the water through the opening 13. The plugs referred to are of greater diameter than the seat for receiving the same. After being seated these plugs form nipples through which the water is discharged. The openings 13, within the plugs 12, may extend at any desired angle to the axes of the plugs.

In carrying out my invention I employ a metal having the properties of compressibility, elasticity, and non-corrodibility, such as brass, copper or lead or a composition of such metals, whereby the apparatus 13 will not become clogged.

And having thus described my said invention, what I claim as new and desire to secure by United States Letters Patent is:

A sprinkling pipe provided with a slightly tapering opening leading from the outer periphery of the same with its smallest diameter on a line with the inner surface of the pipe, and a plug of non-corrodible compressible metal of a diameter greater than the smallest diameter of said opening, said plug being forced into and partly through said opening with its outer end substantially flushed with the pipe and having its inner end protruding a suitable distance within the pipe, said plug having a central bore, as and for the purpose described.

In testimony whereof I affix my signature, in presence of two witnesses.

OLIVER JEFFERSON KENNEDY.

Witnesses:
GRANT GUTHRIE,
K. B. KENNEDY.